Feb. 13, 1968 E. B. BROWN 3,369,230

TELEGRAPHIC KEYER

Filed June 21, 1965 2 Sheets-Sheet 1

INVENTOR.
Edward B. Brown

INVENTOR.
Edward B. Brown 3,369,230
TELEGRAPHIC KEYER
Edward B. Brown, 2915 Kentucky Ave., Topeka, Kans. 66605
Filed June 21, 1965, Ser. No. 465,667
7 Claims. (Cl. 340—353)

This invention concerns a telegraphic keyer, in particular, an electronic telegraphic keyer, actuated by a manually-operated dual key, for the transmission of code signals by, such as, a radio transmitter.

A principal objective obtained by this invention is a keyer which requires fewer and less precise manipulations of the control key in generating telegraphic code signals as compared with those of the art to date.

A principal feature contributing to this improved performance is provided by a single-dot-injection storage circuit. This circuit permits the generation of a dot between, or following, dashes without releasing the dash lever of a dual lever control key. This feature, along with a dash override feature, permits the dot lever to remain operated until the end of the character. The resulting manual operation amounts to a simple squeeze action being applied to the control key in sending most of the characters. Only ONE operation of either or both control levers is required to send any numeral or letter, except letter *x*, in the International Morse Code. These features greatly simplify the manipulation of the keyer, permitting an operator to attain a greater sending proficiency consistent with this manual dexterity.

A feature of this invention is the use of diode clamped RS flip-flop storage circuits controlled with diode gate type logic circuits, providing large operating margins, resulting in stable operation of the keyer.

Another feature of this invention is the use of a stable keyed-oscillator which generates asymmetrical signals for the control of the other circuits in the keyer, and which employs a single-range control for varying signal repetition rate which may be calibrated over a wide range.

An additional feature of this invention is the balanced type shaper circuit actuating a polar type relay for the generation of the output signal. A control permits adjusting for the desired signal mark-to-space ratio independent of the signal speed.

This invention also incorporates present art features including fixed dot-to-dash-period ratio and self-completion of all signals.

The following description of the keyer circuit and its operation will be made with reference to the block diagram shown in FIG. 1. The description and operation of the individual circuits will then be presented with reference to the circuit schematic diagram shown in FIG. 2.

Figure 1:
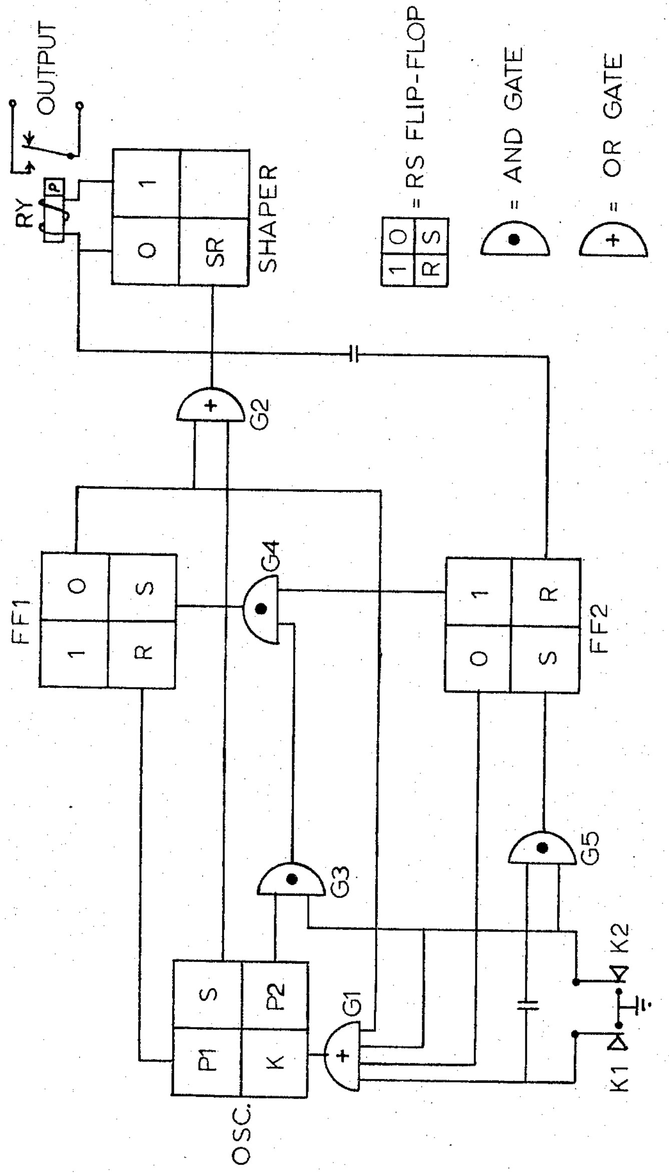

The active circuits are represented in FIG. 1 with square blocks and the logic gates with semicircles. The oscillator circuit, OSC, generates control signals for the other circuits and controls the speed of the keyer. The flip-flop circuit, FF1, functions during dash signal generation and flip-flop, FF2, during the injection of a dot signal between or immediately following dashes. The shaper circuit with the relay, RY, generates the output signal and has control of the mark-to-space ratio. Two OR gate circuits, G1 and G2, are employed and three AND gates, G3, G4, and G5. The relay and the control keys, K1 and K2, are shown in their schematic symbols. The leads with capacitors indicate that only the transitional portions of the signal is coupled. The keyer employs negative logic which, in most cases, involve positive reference-state voltages being switched to ground potential representing the logic 1 condition.

The oscillator has an input keying terminal K and three output terminals P1, P2, and S. The oscillator starts operating when the K terminal is grounded. The output at P1 is a narrow negative pulse about a millisecond in width. This pulse appears at the beginning of each oscillation cycle. With this diagram the output pulse at P2 is assumed to be the same as at P1 except delayed about a millisecond. The main output signal is at terminal S, being sawtooth in shape with a steep negative-going front, extending practically the full oscillation period in length.

The two flip-flop circuits, FF1 and FF2 are identical. They each have two input terminals, R and S, and two output terminals, 1 and 0. A negative pulse applied to the reset terminal R, causes the output 1 to switch to ground potential and the output 0 to switch to a positive potential. A negative pulse to the set terminal S, reverses the potentials on the output terminals.

The input terminal SR of the shaper circuit is normally at a positive potential and the output 0 terminal more positive than the output 1 terminal. This difference of output potential operates the relay to its spacing condition. When the potential on the SR terminal is drawn negative, the circuit abruptly switches the relative potentials of the output terminals, operating the relay to its marking condition. The circuit and relay will restore to the spacing condition abruptly as the potential on the SR terminal reaches a critical value in its swing back into the positive region.

The OR gate circuits shown function in passing any negative signal from the multiple inputs to the common output. The AND gates will pass a signal to the output only when both inputs have a negative signal present. The gates provide signal coupling from inputs to output without coupling the input signal sources together.

Referring to FIG. 1, it may be seen that when the dot key K1 is closed, ground potential passes through gate G1 to the K terminal of the oscillator, starting it operating. The negative sawtooth signal from its S terminal, via gate G2, immediately switches the shaper and relay to marking. Near the mid-period of the sawtooth signal, the critical level at the input of the shaper circuit is crossed, terminating the marking period. Should key K1 still be closed at the end of the sawtooth period, the cycle will be repeated, generating another dot. Neither of the flip-flops are operated during normal dot generation since the AND gates G3 and G5 were blocked by the positive voltage from the open K2 key circuit.

In generating dashes, key K2 is closed, grounding the K terminal of the oscillator through another input of gate G1. The resulting sawtooth signal to the shaper circuit switches the output circuit to marking as when generating a dot. The pulse P2 from the oscillator, in conjunction with the ground from K2, now passes gate G3. Since a ground potential is present at the input of gate G4 from output 1 of flip-flop FF2 which has not been set, the pulse from gate G3 passes through gate G4 and sets flip-flop FF1. The resulting ground from flip-flop FF1 output 0, via gate G2, prevents the input circuit of the shaper from being swung positive, thus maintaining the keyer output in the marking condition during the remainder of the period. The ground from flip-flop FF1 output 0 is also fed, via gate G1, to the K terminal of the oscillator maintaining it ON should key K2 have been released prior to the end of the first period. At the start of the second period the P1 pulse from the oscillator resets flip-flop FF1. Should K2 still be closed, a set pulse will be received immediately following the reset pulse, however, the time constants of the cross-coupling circuits in the flip-flop will not permit the circuit to be set so soon after resetting. The second period sawtooth signal now maintains the shaper and relay marking until mid-period when it switches to spacing for the remainder of the period. It may be seen, that with this method of forming the dot and dash, their relative timing is fixed independent of oscillator repetition rate.

With K1 closed sending dots, the operation of K2 merely enables gate G3 without effecting the oscillator or its output to gate G2. This permits a change from dot to dash generation without the introduction of mark or space distortion.

If, while generating dashes with K2 closed, K1 is closed, the negative transition of the K1 circuit closure, via AND gate G5, will set flip-flop FF2. The potential at output 1 of FF2 switches positive, disabling gate G4. This results in the next signal generated being a dot instead of a dash, since flip-flop FF1 cannot be set under this condition. FF2 is reset by the next space-to-mark transition from the shaper, the front of the dot so injected. With both K1 and K2 still closed, the keyer reverts to generating dashes, since only a reoperation of K1 with K2 closed will set flip-flop FF2 again. If both keys are released immediately after setting FF2, the oscillator will be maintained ON by the ground from output 0 of FF2 until the stored dot has been initiated. As may be seen in the schematic diagram, opening the keying circuit of the oscillator after the cycle has been initiated will not effect the sawtooth signal being generated. This, along with the keying interlock with the flip-flops, assures self completion of signals.

Figure 2:
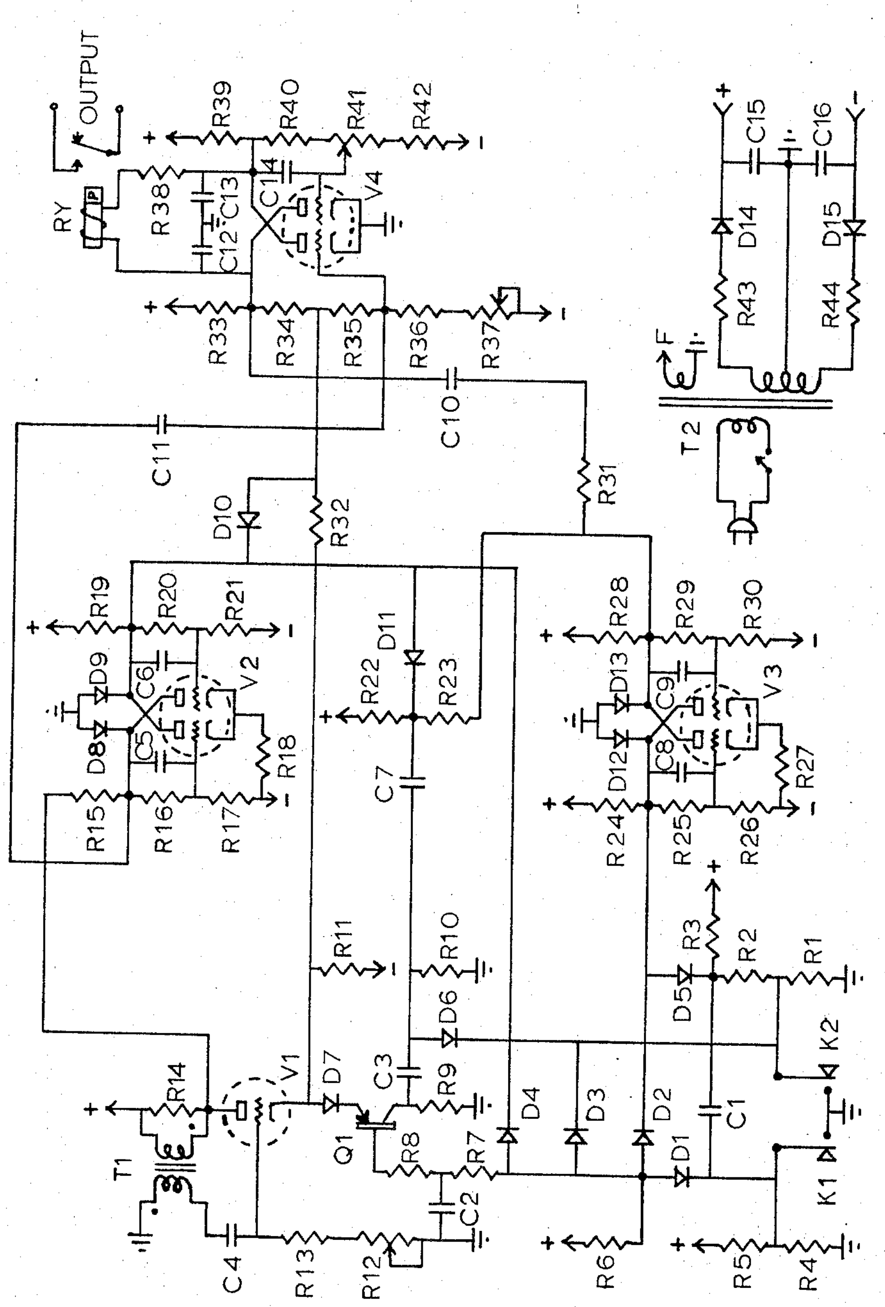

The schematic diagram shown in FIG. 2 is arranged similar to the block diagram of FIG. 1. The oscillator circuit includes tube V1, ½12AU7A; transistor Q1, 2N1303; diode D7, 1N457; transformer T1, 5 watt, 10,000–10,000 ohms; and associated resistors and capacitors. Tube V2, 12AU7A, and associated components comprise flip-flop circuit FF1. Tube V3, 12AU7A, and components make up flip-flop circuit FF2. The shaper circuit containing V4, 12AU7A, and components, drives the 4,000 ohm polar relay RY which has a sensitivity of ±1.5 milliamperes.

All diodes in the keyer are type 1N457 except D14 and D15 in the power supply which are type 1N2070. All resistors are ½ watt size except R43, 470 ohms, 1 watt, and R44, 1,000 ohms, 1 watt, in the power supply. The other components comprising the power supply are transformer T2, 250 v. CT—25 ma. and 6.3 v.—1 a., and capacitors C15 and C16, 80 μf.—150 v., each.

Components terminating with an arrow marked + or — indicate a connection to the positive voltage bus or negative voltage bus from the common power supply.

The oscillator circuit is of the blocking type. The transistor Q1 keys the cathode circuit of tube V1. Q1 is normally biased nonconducting by the application of about +20 volts to its base from the open K1 key circuit via diode D1 and resistor R6, 2.2 megohms, and about +10 volts being applied to its emitter from the cathode of tube V1 via diode D7. The voltage at the key K1 is provided by the divider resistors R4, 47,000 ohms, and R5, 270,000 ohms, from the positive voltage bus. The cathode resistor R11, 270,000 ohms, which is returned to the negative voltage bus, results in only a fraction of a milliampere of conduction by the tube. The resulting cathode circuit impedance is too high under this condition to permit the oscillator circuit to regenerate.

When ground is applied to the oscillator keying circuit input, the base circuit of transistor Q1, via diode D1, D2, D3, or D4, capacitor C2, .05 μf., is discharged through resistor R7, 560 ohms, drawing the base of the transistor more negative than its emitter, causing it to conduct. Resistor R8, 10,000 ohms, in the base circuit limits the base current to a value sufficient to saturate emitter to collector conduction. This results in switching the cathode of tube V1 to ground through the 1,000 ohm resistor R9. This impedance value is low enough to cause regeneration to take place around the feedback circuit through transformer T1. In less than a millisecond the resulting induced E.M.F. pulse in the transformer collapses, leaving a charge of about 75 volts in capacitor C4, .05μf. Due to the cathode follower action of the circuit, the potential of the cathode of V1 drops to about —60 volts, back-biasing the diode and transistor again. Capacitor C4 begins discharging through resistor R13, 220,000 ohms, and variable resistor R12, 0–2.0 megohms, in series. When the charge reaches about 10 volts the cathode potential will be swinging into the positive range, and if the ground is still present on the base circuit, the transistor will be forward-biased causing another cycle of oscillation to be initiated. The repetition rate of the oscillator is a function of the discharge time of C4 and is varied with the speed control resistor R12. The range of adjustment is from about 4 to 40 cycles per second. The sawtooth signal at the cathode of V1 is coupled through resistor R32 to the shaper circuit and the negative pulse for resetting flip-flop FF1 is taken from the plate circuit. Resistor R9, in the collector of Q1, increases circuit stability and provides a narrow pulse for the operation of gate G3.

The shaper circuit is a form of flip-flop which is both set and reset at critical voltage levels on a single input circuit. The positive bus-to-plate resistors R33 and R39 are 18,000 ohms each. Resistors R40, 270,000 ohms, R41, 50,000 ohms, and R42, 470,000 ohms, form one of the cross coupling circuits and resistors R34, 270,000 ohms, R35, 68,000 ohms, R36, 750,000 ohms, and R37, 0–250,000 ohms, form the other cross coupling circuit. The relay RY is connected in series with resistor R38, 5,600 ohms, between the two plate circuits. During the idle condition the plate circuit fed through R39 is conducting, drawing current through the relay winding via resistors R38 and R33, operating the relay to its spacing condition. In this state the potential on the input circuit, the junction of R34 and R35, is about +15 volts. When a negative signal is applied to this point, the shaper circuit will flip its state of conduction, reversing the direction of current flow through the relay, operating it to its marking condition. As the signal allows the voltage at the input of the shaper to return positive, at about +4 volts the circuit will flop back to its idle state returning the relay to its spacing condition. The variable resistor R37 varies the voltage level at which the circuit switches, permitting the mark-to-space transition to be shifted either side of the center of the sawtooth signal period. Capacitor C14, .001 μf., improves the transient response of the circuit, and capacitors C12 and C13, each .001 μf., keep extraneous high frequency signals from effecting its operation. The potentiometer R41 permits compensation for circuit component variations.

The two RS flip-flop circuits FF1 and FF2 are identical. The positive-bus-to-plate resistors R15 and R19 in FF1, and R24 and R28 in FF2 are each 100,000 ohms. The plate-to-grid-cross-coupling resistors R16 and R20 in FF1, and R25 and R29 in FF2 are each 100,000 ohms. The grid-to-negative-bus resistors R17 and R21 in FF1, and R26 and R30 in FF2 are each 68,000 ohms. The grid-to-plate-cross-coupling capacitors C5 and C6 in FF1, and C8 and C9 in FF2 are each .02 μf. The cathode-to-negative-bus resistors R18 in FF1 and R27 in FF2 are each 47,000 ohms. Plate-to-ground-clamping diodes D8 and D9 in FF1, and D12 and D13 in FF2 are employed to reference the plate circuits to ground potential for circuit stabilization. Due to the simplified circuitry employed, the reset and set inputs may be considered being connected to the 1 and 0 outputs respectively. The reset pulse for FF1 is connected in series with the plate resistor R15. The reset circuit for FF2 is connected between its output 1 plate circuit and the output 0 plate circuit of the shaper with resistor R31, 100,000 ohms and capacitor C10, .005 $\mu$f., in series.

The flip-flop will be in its reset state following the application of a negative pulse to its output 1 circuit. This results in diode D8 in FF1 and diode D13 in FF2 conducting, clamping the circuits to ground potential. Under this condition the output 0 circuit will be at about +30 volts. When the circuits are set the output voltages are reversed.

The OR gate G1 is composed of resistor R6, 2.2 megohms, and diodes D1, D2, D3, and D4. A ground on any one of the diode cathodes will carry through to the oscillator keying circuit. This takes place if either key K1 or K2 is operated or if either flip-flop FF1 or FF2 is set.

The OR gate G2 consists of resistor R32, 270,000 ohms, and diode D10. R32 is employed in lieu of a diode since a voltage level translation is required between the cathode of the oscillator and the input of the shaper. Diode D10 keeps the input circuit of the shaper from going positive whenever FF1 is set.

AND gate G3, comprised of capacitor C3, .05 $\mu$f., diode D6, and resistor R10, 100,000 ohms, is actually a negative output differentiator circuit. This circuit receives a positive narrow pulse from the oscillator, derived from resistor R9 in the collector circuit of transistor Q1. When key K2 is closed capacitor C3 is charged during the pulse interval, via diode D6, to the amplitude of the pulse, about 20 volts. Upon completion of the input pulse the discharge of C3, via resistor R10, results in a negative output pulse at the junction of C3 and R10 of about 20 volts. The positive pulse will be passed with little distortion when K2 is open, having little effect on the negative logic circuits that follow. The circuit functions, therefore, similar to a fast acting AND gate having a delay equal to the width of the input pulse.

AND gate G4 is comprised of capacitor C7, .005 $\mu$f., resistors R22, 1.0 megohm, and R23, 330,000 ohms, and diode D11. With flip-flop FF2 reset, ground is applied to the bottom of R23. This results in a voltage at the junction of R23, R22 and the cathode of D11 of about +30 volts. This is about the same voltage that is applied to the anode of D11 from flip-flop FF1 in its reset state. Since D11 will conduct with any reduction of its cathode potential, the gate is enabled for negative pulse transmission via C7. When FF2 is set, about +30 volts is applied to the bottom of R23 by the flip-flop. This results in about +55 volts at the cathode of D11. With +30 volts from FF1 to the anode of D11, a back bias of about 25 volts is across the diode. A negative pulse with an amplitude in excess of this value would be required to pass any current through the gate. Since the negative pulse from gate G3 is only about 20 volts, none will pass G4 under this condition.

AND gate G5 is very similar to gate G4. It consists of capacitor C1, .01 $\mu$f., resistors R1, 100,000 ohms, R2, 100,000 ohms, R3, 270,000 ohms, and diode D5. When key K2 is open, the potential at the cathode of D5 is about +55 volts and about +30 volts at its anode with FF2 reset. Since the negative transition pulse from the operation of key K1 is only about 20 volts, it cannot pass the gate. With K2 operated, shorting resistor R1 from the voltage divider, the cathode potential of D5 is within a few volts of its anode, permitting the K1 pulse to pass.

Capacitor C11, .002 $\mu$f., is connected between flip-flop FF1 output 1 and the input grid of tube V4 in the shaper circuit to neutralize the effect of a switching transition pulse from the oscillator and FF1 during the generation of a dash which could cause a premature resetting of flip-flop FF2.

I claim:

1. In a keyer: a keyed oscillator; a shaper, coupled to said oscillator and keyer output; a 1st flip-flop, coupled to said oscillator and shaper; a 2nd flip-flop, coupled to said 1st flip-flop, oscillator, and shaper; a 1st control key, coupled to said oscillator and 2nd flip-flop; a 2nd control key, coupled to said oscillator, 1st flip-flop, and 2nd flip-flop.

2. In a keyer: a keyed oscillator with keying input and with signal and pulse output; a shaper with input and output; a 1st flip-flop with input coupled to said oscillator pulse output, and output coupled to said shaper input; a 2nd flip-flop with input coupled to said shaper output; a 1st control key; a 2nd control key; a 1st gate, coupling said 1st control key, 2nd control key, 1st flip-flop output, and 2nd flip-flop output to said oscillator keying input; a 2nd gate, coupling said oscillator signal output and 1st flip-flop output to said shaper input; a 3rd gate, controlled by said 2nd control key, generating a pulse initiated by said oscillator pulse output, and coupling said pulse to a 4th gate, controlled by said 2nd flip-flop output, coupling said pulse to said 1st flip-flop input; a 5th gate, controlled by said 2nd control key, coupling said 1st control key to said 2nd flip-flop input; a relay, coupling said shaper output to keyer output.

3. In a keyer: a keyed blocking oscillator with transformer feed-back, common-collector transistor cathode keying, cathode follower signal output, narrow positive and negative control pulse output, and a control providing wide-range variation of signal repetition rate; a shaper, coupled to said oscillator and keyer output; a 1st flip-flop, coupled to said oscillator and shaper; a 2nd flip-flop, coupled to said 1st flip-flop, oscillator, and shaper; a 1st control key, coupled to said oscillator and 2nd flip-flop; a 2nd control key, coupled to said oscillator, 1st flip-flop, and 2nd flip-flop.

4. In a keyer: a keyed oscillator; a balanced, regenerative, shaper with a control providing wide-range variation of signal mark-to-space ratio, coupled to keyer output with a polar relay; a 1st flip-flop, coupled to said oscillator and shaper; a 2nd flip-flop, coupled to said 1st flip-flop, oscillator, and shaper; a 1st control key, coupled to said oscillator and 2nd flip-flop; a 2nd control key, coupled to said oscillator, 1st flip-flop, and 2nd flip-flop.

5. In a keyer: a keyed oscillator; a shaper, coupled to said oscillator and keyer output; a 1st reset-set type flip-flop, stabilized with output clamping diodes, unbypassed common cathode resistor, and large cross-coupling capacitors, coupled to said oscillator and shaper; a 2nd flip-flop, identical to said 1st flip-flop, coupled to said 1st flip-flop, oscillator, and shaper; a 1st control key, coupled to said oscillator and 2nd flip-flop; a 2nd control key, coupled to said oscillator, 1st flip-flop, and 2nd flip-flop.

6. In a keyer: a keyed oscillator; a shaper, coupled to said oscillator and keyer output; a 1st control key, coupled to said oscillator; a 1st flip-flop, coupled to said oscillator and shaper; a 2nd control key, coupled to said oscillator and to a pulse-inverting diode-differentiator connected to said oscillator; a 2nd flip-flop, coupled to said shaper and oscillator, and connected to a gate, controlling keyed pulse from said diode-differentiator to said 1st flip-flop; a differentiator, coupling said 1st control key to a gate, controlled by said 2nd control key, connected to said 2nd flip-flop.

7. In a keyer: a keyed oscillator with a control for varying signal frequency; a shaper, coupled to said oscillator and keyer output, with a control for varying signal mark-to-space ratio; a 1st flip-flop, coupled to said oscillator and shaper, functioning during dash signal generation; a 2nd flip-flop, coupled to said 1st flip-flop, oscillator, and shaper, functioning during injected-single-dot signal generation; a 1st control key, coupled to said oscillator and 2nd flip-flop, actuated singly controls dot signal generation; a 2nd control key, coupled to said oscillator, 1st flip-flop, and 2nd flip-flop, actuated singly controls dash signal generation; actuation of said 1st control key while said 2nd control key is actuated, injects a single dot signal between dash signals generated, without distortion of said signals; actuation of said 2nd control key while said 1st control key is actuated, changes from dot signal generation to dash signal generation without distortion of said signals; said oscillator frequency control will vary rate of generated signal over a ten-to-one range with negligible change of signal mark-to-space ratio; said shaper control will vary mark-to-space ratio of generated signal with negligible change of signal rate.

No references cited.

THOMAS B. HABECKER, *Primary Examiner.*